R. H. MOSS.
PIPE-COUPLING.
No. 193,174.   Patented July 17, 1877.
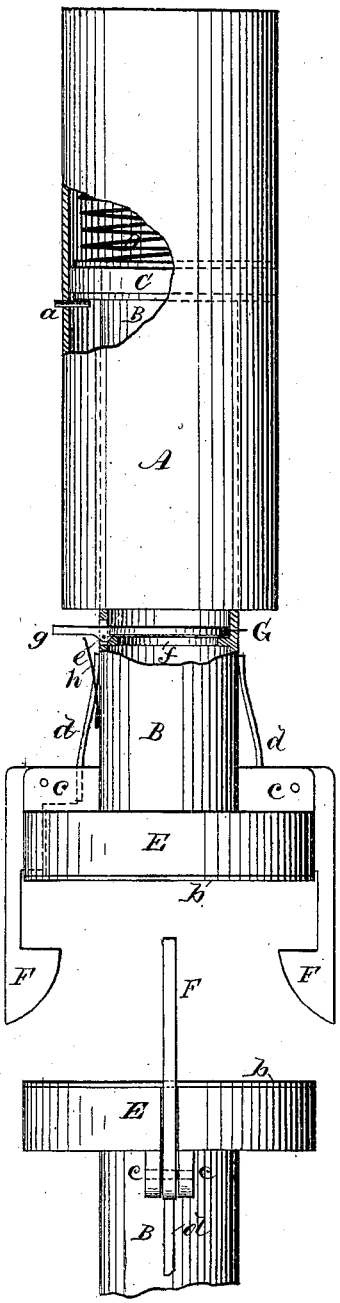

UNITED STATES PATENT OFFICE.

RUFUS H. MOSS, OF SALEM, OREGON.

IMPROVEMENT IN PIPE-COUPLINGS.

Specification forming part of Letters Patent No. 193,174, dated July 17, 1877; application filed June 4, 1877.

*To all whom it may concern:*

Be it known that I, RUFUS H. MOSS, of Salem, in the county of Marion and State of Oregon, have invented a new and Improved Pipe-Coupling, of which the following is a specification:

The object of my invention is to provide a coupling for uniting the pipes used in conveying hot air for heating cars, that may be quickly coupled and readily uncoupled.

Referring to the drawing, which is a side elevation of my improved coupling, A is a cylinder, that is attached to the end of the pipe that conveys the heated air.

In this cylinder a tube, B, is placed, which is provided with the flange or collar C, which accurately fits the cylinder A, and is packed to insure an air-tight joint between it and the cylinder.

D is a spring, that rests against an internal flange formed in the cylinder A, and presses against the collar C, throwing the tube B outward.

A stop-pin, $a$, is placed in the cylinder A, for limiting the outward motion of the collar C. Upon the outer end of tube B a flange, E, is formed, which is faced with an elastic packing-surface, $b$.

Catches F are pivoted in ears $c$, formed on the back of the flange E, on opposite sides of the tube B, and are provided with square shoulders, that rest upon springs $d$, that are attached to the tube B. The springs serve to hold the catches F open or closed. G is a valve, that is pivoted in the side of the tube B at $e$, and is capable of closing against a seat, $f$, formed in the tube.

A lever, $g$, is attached to the said valve, which strikes the edge of the cylinder A, as the tube B is forced into the said cylinder, and opens the valve, and when the tube B is thrown outward by the spring D, a spring, $h$, which is attached to the tube B and presses against the lever $g$, closes the valve.

The parts of the coupling are alike on each end of the car, and when the parts on adjacent cars are united, the catches F of one part engage the flange of the other. The tube B and flange C move longitudinally in the cylinders A, as the cars move toward or from each other in running, and when the couplings are detached the valve G closes automatically, preventing the escape of air.

Having thus described my invention, I claim as new and desire to secure by Letters Patent—

1. The cylinder A, spring D, tube B, having flanges C E, and the spring-catches F, in combination, substantially as shown and described.

2. The combination of the valve G, having the lever $g$, with the tube B, substantially as shown and described.

RUFUS H. MOSS.

Witnesses:
J. A. BAKER,
H. A. JOHNSON.